United States Patent Office 3,337,509
Patented Aug. 22, 1967

3,337,509
HARDENED EPOXIDE RESINS WITH HIGH TEMPERATURE STABILITY OF TRIGLYCIDYL ESTER OF ISOCYANURIC ACID AND CURING AGENT
Manfred Budnowski, Dusseldorf-Holthausen, Germany, assignor to Henkel & Cie G.m.b.H., Dusseldorf-Holthausen, Germany, a corporation of Germany
No Drawing. Filed July 3, 1963, Ser. No. 292,725
Claims priority, application Germany, Jan. 31, 1963, H 48,118
6 Claims. (Cl. 260—77.5)

The subject matter of the present invention is a process for the preparation of hardened epoxide resins which exhibit an increased temperature resistance in comparison to the known resins.

It is known in the production of plastics to harden compounds which contain more than one epoxide group in the molecule in admixture with suitable hardeners at normal or elevated temperature. Products having excellent strength are in many instances obtained thereby. However, a disadvantage of the known epoxide resins resides in that their strength sharply decreases at temperatures above 150° C.

It has now been found that epoxide resins with surprisingly good temperature stability are obtained when isocyanuric acid glycidyl ester with an epoxide oxygen content of at least 14% is hardened with customary hardening agents.

Isocyanuric acid triglycidyl ester has an epoxide oxygen content of 16.1%. This compound, which has heretofore not yet been described in pure crystalline form, occurs in two modifications of which one has a melting point of 107° C. (corrected) and the other has a melting point of 158° C. (corrected). These two modifications may be separated by virtue of their different solubilities. However, for technical employment a separation is not required.

It is, therefore, an object of this invention to provide a method for producing a hardened epoxide resin having greater temperature stability.

Another object is to provide a hardened epoxide resin having improved strength and shape retention properties at high temperatures.

A further object is to provide a pure, crystallized isocyanuric acid glycidyl ester having an epoxide content of at least 14 percent, and the hardened resin obtained therefrom.

These and other objects of the invention will become apparent as the description thereof proceeds.

The isocyanuric acid glycidyl esters used in accordance with the present invention may be obtained by purification of resinous raw products, which are, for instance, produced by the process of copending patent application Ser. No. 288,593, filed June 18, 1963, now Pat. No. 3,288,789 entitled, "Process for the Preparation of Hardenable Compounds Containing Epoxide Groups," by reaction of one mol of cyanuric acid with at least 30 mols of epichlorhydrin at temperatures between 80 and 200° C. These reaction products exhibit an epoxide oxygen content between about 8.5 and 12%. The purification may be effected by a single or repeated recrystallization from suitable solvents, such as methanol. The preparation of the raw product may also be accomplished by known methods, such as by the process of British Patent 888,945 by reacting cyanuric acid with excess epichlorhydrin in the presence of catalysts, such as ion exchangers in the form of salts or free bases. Another known process for the preparation of the resinous raw product consists of initially reacting cyanuric acid with epichlorhydrin in the presence of organic bases to form the chlorohydrinester, and then in a second step splitting off hydrogen chloride from this chlorohydrinester with the aid of an alkali.

The above described processes yield resinous products which exhibit maximum epoxide oxygen content of about 12%. The purified glycidyl ester used in accordance with the present invention, which has an epoxide oxygen content of at least 14%, is a crystallized substance which is substantially more stable than the raw product. Mixtures of the purified compound with solid hardeners also have a practically unlimited shelf-life stability.

It should be noted that it was heretofore not known that the resinous raw products produced by the above described known processes are isocyanuric esters. These products are, for example, designated as cyanuric acid esters in U.S. Patent 2,809,942. Cyanuric acid glycidyl esters are obtained by different methods, for instance, by the method described in U.S. Patent 2,741,607 by reaction of cyanuric chloride with glycide in the presence of sodium hydroxide, chloroform being employed as the solvent. In accordance with another known process, cyanuric acid glycidyl ester is obtained by reaction of cyanuric chloride with epichlorohydrin in the presence of metallic sodium. The crystallized cyanuric acid triglycidyl ester melts at 53–60° C. It reacts with customary high temperature hardeners so vigorously that, for instance, upon melting it together with phthalic acid anhydride the mixture chars. When the ester is hardened carefully with maleic acid anhydride which has a relatively low melting point, the synthetic resin obtained thereby does not exhibit the same favorable properties as the products produced by the process according to the present invention.

The purified isocyanuric acid triglycidyl ester may be hardened with all of the compounds previously proposed for hardening of epoxide resins. Depending upon the type of hardener employed, the hardening may be effected by heating or without supply of exterior heat. The mixtures of epoxide compound and hardeners exhibit a very long pot life in relation to their high epoxide oxygen content.

Of course, the heat resistance of the hardened compounds depends upon the type and amount of hardener which is used.

Hardeners which may be employed for this purpose are both the acidic and basic hardeners. Among the acidic hardeners are, for example, anhydrides of hydrocarbon di- and polycarboxylic acids preferably with 4 to 20 carbon atoms. Such compounds include, for example, the anhydrides of maleic acid, adipic acid, sebacic acid, phthalic acid, terephthalic acid, tetrahydrophthalic acid, etc. Also polymeric products, such as high molecular adipinic acid anhydride or mixtures of polymerisates of maleic acid anhydride with other polymerizable compounds can be used as hardeners. For basic hardening, organic nitrogen bases which contain primary, secondary or tertiary nitrogen atoms once, twice or several times in the molecule, and containing at least one amino radical having at least one hydrogen atom bonded to the nitrogen atom, may be used as hardeners. Examples of such compounds are ethylene diamine, diethylene triamine, triethylene tetramine, piperidine, dicyandiamide, diacetoneamine, benzidine, p,p'-diamine-diphenyl methane, reaction products formed by aliphatic polyamines with dicyandiamide, and others such as versamides, i.e. polyamides which contain free amino groups.

Hardening agents which resulted in relatively good temperature resistance with the previously employed epoxide resins, such as phthalic acid anhydride, tetrahydrophthalic acid anhydride, endomethylenetetrahydrophthalic acid anhydride, β-naphtholsuccinic acid anhydride (reaction product of β-naphthol and maleic acid anhydride), hexachloroendomethylenetetrahydrophthalic acid anhydride (so-called HET-anhydride), dicyandiamide, methylenebis-aniline or benzidine, produce particularly favorable results. In general, the so-called high temperature hardening procedure yields better results than hardening without the supply of external heat. In all investigated instances the heat resistance of the hardened product of the invention was higher than upon hardening of the previously known epoxide resins with the same hardening agent.

For purposes of hardening, a mixture is formed with the crystalline glycidyl ester of isocyanuric acid as described, and the hardener. If the hardener is a solid, the solid mixture can be pulverized and intimately admixed. If the hardener is a liquid, the substances may be admixed with each other and the mixture heated until everything is in the molten state. This method may, of course, also be applied to obtain admixture of solid glycidyl ester with a solid hardener.

The ratio of resin to hardener depends upon the structure of the hardener which has been employed and may vary within wide limits.

The hardeners are generally used in quantities ranging from 5% to 75% by weight based upon the total weight of the mixture of glycidyl ester and hardener. For each mixture of glycidyl ester and any particular hardener there is a certain relatively narrow range within which optimum values can be reached. For small additions of hardeners within the range of 5–10 by weight, amines are preferably used. For instance, when dicarboxylic acid anhydrides are used, about 1 mol of the hardener is added per equivalent of epoxide oxygen.

If compounds with active hydrogen atoms are used as hardeners, such as carboxylic acids, primary or secondary amines, mercaptans, sulfonamides and the like, there are 0.5 to 1.5 epoxide groups per active hydrogen atom. This means that from 1 to 3 epoxide equivalents are present for each primary amino group of a hardener, and 0.5 to 1.5 epoxide equivalents for one secondary amino group of a hardener. The latter relationship is also applicable to hardeners which contain carboxyl groups.

The situations is different in the case of hardeners which contain carboxylic acid anhydride groups or tertiary amino groups. Only 0.5 to 1.5 epoxide equivalents are present for each carboxylic acid anhydride group of a hardener, and not double that amount. On the other hand, tertiary amines or Lewis acids, such as $BF_3$ complexes, are already active in catalytic amounts of 1 to 10% by weight of the epoxide to be hardened. Thus, it may be seen that the amount of hardener may be quite different depending upon its chemical structure. Those hardeners are primarily suitable which can be used in amounts larger than catalytic amounts, that is, in which 0.5 to 1.5 epoxide equivalents are present for each active hydrogen atom or for each carboxylic acid anhydride group.

In order to harden with the organic carboxylic acid anhydrides, elevated temperatures are used. The mixture is heated to temperatures within the range of 80 to 250° C., preferably between 100 and 180° C. Quite generally—that is, in the case of organic carboxylic acid anhydride hardeners as well as in the case of basic amine hardeners—an improvement in the mechanical properties of the hardened resin can be achieved by post-hardening at the hardening temperature or at temperatures above the hardening temperature.

In general, better results are obtained by application of high hardening temperatures than at low temperatures. The hardening period depends upon the temperature which is applied and is about 10 to 30 hours, provided no accelerators are added. With the aid of such accelerator additives the hardening period can be reduced to about 3 to 8 hours. Examples of suitable accelerators are compounds which contain one or more hydroxyl groups, such as octanol or glycerin, as well as tertiary amines, such as N-alkylpiperidines or 2,4,6-tris-(dimethylaminomethyl)-phenol, quaternary ammonium bases or their salts, such as benzyltrimethylammoniumhydroxide or the chloride of this base, and also sulfonium salts or thiodiglycol.

The resin-hardener mixtures may further be admixed with fillers, such as powdered quartz, powdered rock, asbestos, glass fibers, nylon fibers, sawdust or pulverized synthetic resins.

The glycidyl esters according to the present invention may, in admixture with hardeners, be used as adhesives for a variety of materials, such as paper, cardboard, wood or other cellulose-containing materials, textiles, porcelain, stoneware or other ceramic materials, glass, metals such as iron, aluminum, copper, etc. They may be used as adhesives between identical materials as well as between different materials.

In addition, the glycidyl esters according to the present invention may, together with hardeners, be used as molding resins. These molding resins may either be used to produce shaped objects having a relatively complicated structure such as are difficult to obtain by other means, or may be used to fill empty spaces in apparatus of all types. The resins have favorable characteristics, especially electric arc resistance, which make them useful in electrical applications. Entire circuits or electrical apparatus which include a great number of soldering connections may be molded with hardenable resin mixtures according to the present invention, so that upon hardening of the resin mixture a resin block is formed in which the electrical circuits are protected from rupture or mechanical damage.

The particular advantage of the triglycidyl ester derivatives of isocyanuric acid and of the hardened resins obtained therefrom is their high temperature resistance.

It should be particularly emphasized that the shape retention under high temperatures according to Martens (DIN 53,458) of the hardened products produced by the process according to the present invention is unusually high. In some instances values above 250° C. were obtained. Also, upon testing for continuous exposure to heat excellent results were achieved, and the Martens values in all cases considerably increased still more during testing. The weight loss of the test samples determined in this test was unusually low.

It should further be noted that hardened products are characterized by a particularly light color, unless a discoloration was caused by the hardener. For instance, shaped objects produced from purified isocyanuric acid glycidyl esters in accordance with the present invention and hardened with dicarboxylic acid anhydrides are clear and colorless, or at most slightly yellowish.

The applicant has previously discovered that by high temperature hardening of an epoxide resin produced from α,α'-(9,10-dihydro-anthrylene-(9,10))-succinic acid (so-called anthrazene succinic acid) or its anhydrides, plastics with improved heat-resistance are obtained (U.S. Patent 3,065,186). The epoxide hardened resins in accordance with the present invention are substantially superior to these resins with respect to various properties, especially with respect to their shape retention at high temperatures.

The following specific examples are presented to illustrate the invention and to enable persons skilled in the art to better understand and practice the invention and are not intended to be limitative.

Example I 258 gm. (2 mols) of cyanuric acid and 11,100 gm. (120 mols) of anhydrous epichlorohydrin were refluxed for 19 hours while stirring. The temperature of the mixture rose from 115° to 119° C. during this time. Thereafter, the major amount of excess epichlorohydrin was distilled off under a pressure of 40 mm. mercury and then the residual volatile components were distilled off at a pressure of 1 mm. mercury up to a bath temperature of 110° C. 590 gm. of a light yellow, viscous resin were obtained, which had an epoxide oxygen content of 11.2%. 300 gm. of this product were dissolved in 900 gm. of hot methanol. Thereafter, the solution was cooled and the precipitate which had crystallized out was filtered off. 144 gm. of a crystallized substance with a melting point of 100 to 125° C. and an epoxide oxygen content of 14.1% were obtained.

By evaporation of the mother liquor, 151 gm. of resinous components with an epoxide oxygen content of 8.5% were obtained. These components were added to the subsequent crystallization mixture after the preparation of the epoxide resin. Upon repetition of the test, after removal of crystalline compounds the chlorine content of the mother liquor was first determined. Thereafter, the solution was admixed while stirring and at room temperature with small portions of solid caustic soda in an amount equivalent to the chlorine content of the mother liquor, taking care that a pH value of 10 was not exceeded. Thereafter, the solid components which had crystallized out were filtered off and were extracted with methylene chloride. 69 gm. of a crystalline product having an epoxide content of 15.1% crystallized out of the methylene chloride solution as a further yield of crystalline product.

For the isolation of the two pure isomeric modifications, 20 gm. of the above-described crystalline isocyanuric acid triglycide ester mixture having an epoxide oxygen content of 15.1% were dissolved in 80 gm. of hot methanol, and after allowing the solution to cool to 50° C. it was filtered. The residue remaining on the filter was recrystallized from methylene chloride. 5 gm. of the compound were obtained which had an epoxide oxygen content of 16.1% and a melting point of 158° C. (corrected). 13 gm. of a compound having an epoxide oxygen content of 15.8% and a melting point of 102° C. crystallized out of the methanolic mother liquor. After further recrystallization from methanol, this modification was also obtained analytically pure.

| Analysis | Percent | | | Epoxide Oxygen, Percent |
|---|---|---|---|---|
| | C | H | N | |
| Calculated | 48.5 | 5.1 | 14.2 | 16.1 |
| Found: | | | | |
| Low melting point form | 48.5 | 5.3 | 14.4 | 16.0 |
| High melting point form | 48.7 | 5.2 | 14.2 | 16.1 |

Example II 100 gm. of the crystallized glycidylisocyanurate having an epoxide oxygen content of 14.1%, produced according to Example I, were admixed with 120 gm. of phthalic acid anhydride. Test samples were prepared from this mixture, and these test samples were hardened for 15 hours at 180° C. The test samples furnished the following test results:

Shape stability at high temperatures according to
  Martens _____ ° C__ 201
Impact resistance _____ cm. kg./cm.$^2$__ 8.5
Brinell-hardness _____ kg./cm.$^2$__ 1680

In the same manner as described above, 100 gm. of the crystallized glycidylisocyanurate having an epoxide oxygen content of 15.1% (see Example I, second paragraph) were admixed with 130 gm. of phthalic acid anhydride and the mixture was hardened for 15 hours at 180° C. The following test results were obtained:

Shape resistance at high temperatures according to
  Martens _____ ° C__ 212
Impact resistance _____ cm. kg./cm.$^2$__ 9.1
Brinell-hardness _____ kg./cm.$^2$__ 1680

At a hardening temperature of 200° C. the following values were obtained:

Shape resistance at high temperatures according to
  Martens _____ ° C__ 218
Impact resistance _____ cm. kg./cm.$^2$__ 14.5
Brinell-hardness _____ kg./cm.$^2$__ 1770

When the test samples were hardened at 230° C. for 15 hours the following values were observed:

Shape resistance at high temperatures according to
  Martens _____ ° C__ 248
Impact resistance _____ cm. kg./cm.$^2$__ 10.1
Brinell-hardness _____ kg./cm.$^2$__ 1850

Example III

The following example demonstrates that even larger amounts of the two practically pure modifications can be produced in very simple fashion from cyanuric acid and epichlorohydrin.

7.2 kg. of cyanuric acid (technical grade) and 300 kg. of epichlorohydrin were refluxed for 14 hours in a stirring vessel having a capacity of 350 liters. During this time the sump temperature rose from 112° C. to 117° C. Thereafter, the solution was cooled to 60° C. and was freed from undissolved technical side products of cyanuric acid (about 100 gm.) by filtration; the filtrate was then introduced under a pressure of 20 ml. of mercury into a thin-layer evaporator whose jacket temperature was maintained at 110° C. 270 kg. of epichlorohydrin were recovered as a distillate. 1.8 kg. of glycidylisocyanurate crystallized out of the residual solution; after washing to the glycidylisocyanurate once with methanol it had a melting point of 154–156° C. and an epoxide oxygen content of 15.7%.

The filtrate was again introduced under a pressure of 0.6 ml. mercury and 130° C. jacket temperature into the thin-layer evaporator. 14 kg. of distillate (primarily dichlorohydrin) and 16 kg. of epoxide resin having an epoxide oxygen content of 10.8% were obtained. The epoxide resin was dissolved in 45 liters of methanol. An ample amount of crystals separated out of the solution after a few hours; after separation by filtration the crystals were found to have an epoxide oxygen content of 14.1% and a melting point of 98–101° C. After recrystallizing them again from methanol (4 liters/kg. of raw product) 6.1 kg. of glycidylisocyanurate having an epoxide oxygen content of 15.2% and a melting point of 102–104° C. were obtained.

The two practically pure modifications of the glycidylisocyanurate obtained in this manner were admixed with varying amounts of phthalic acid anhydride. Test samples were prepared from these mixtures, which were hardened for 15 hours at varying temperatures. The ratio of epoxide compound to hardener, the hardening temperature and the test results obtained with the aid of the test samples are shown in the following Tables I and II.

TABLE I.—MIXTURES OF THE LOW MELTING POINT FORM OF ISOCYANURIC ACID TRIGLYCIDYL ESTER (M.P.; 101–104° C.; EpO.; 15.2%) AND PHTHALIC ACID ANHYDRIDE

| Ratio of Epoxide Compound: Hardener | Hardening Temperature, ° C. | Martens Temperature, ° C. | Impact Strength, cm. kg./cm.² | Hardness, kg./cm.² |
|---|---|---|---|---|
| 10:12 | 180 | 216 | 4.0 | 1,700 |
| 10:14 | 180 | 205 | 9.35 | 1,614 |
| 10:12 | 200 | 221 | 6.35 | 1,789 |
| 10:14 | 200 | 221 | 16.00 | 1,794 |
| 10:12 | 230 | 246 | 5.65 | 1,794 |
| 10:14 | 230 | 249 | 10.00 | 1,846 |

TABLE II.—MIXTURES OF THE HIGH MELTING POINT FORM OF ISOCYANURIC ACID TRIGLYCIDYL ESTER M.P.; 154–156° C.; EpO; 15.7%) AND PHTHALIC ACID ANHYDRIDE

| Ratio of Epoxide Compound: Hardener | Hardening Temperature, ° C. | Martens Temperature, ° C. | Impact Strength, cm. kg./cm.² | Hardness, kg./cm² |
|---|---|---|---|---|
| 10:12 | 180 | 192 | 8.0 | 1,794 |
| 10:14 | 180 | 190 | 4.65 | 1,700 |
| 10:12 | 200 | 208 | 7.35 | 1,745 |
| 10:14 | 200 | 210 | 16.00 | 1,612 |
| 10:12 | 230 | 240 | 8.65 | 1,872 |
| 10:13 | 230 | 230 | 7.35 | 1,722 |

*Example IV*

Samples of the two forms of triglycidylisocyanurate produced in accordance with Example III were admixed with equal parts of a mixture consisting of 3 parts by weight of phthalic acid anhydride and 1 part by weight of tetrahydrophthalic acid anhydride. With the aid of this mixture, hard aluminum strips of 100 x 20 x 2 mm. were adhesively bonded, the overlapping distance being 10 mm. The bonded strips were hardened for 15 hours at 150° C. Thereafter, the shear strength was tested in relation to the tearing temperature. The values thus obtained are shown in the following Tables III and IV:

TABLE III.—TESTS WITH THE LOW MELTING POINT FORM OF TRIGLYCIDYLISOCYANURATE

| Tearing temperature: | Shear strength, kg./mm.² |
|---|---|
| Room temperature | 1.2 |
| 100° C. | 1.5 |
| 200° C. | 1.6 |
| 250° C. | 1.5 |
| 300° C. | 2.0 |

TABLE IV.—TESTS WITH THE HIGH MELTING POINT FORM OF TRIGLYCIDYLISOCYANURATE

| Tearing temperature: | Shear strength, kg./mm.² |
|---|---|
| Room temperature | 1.3 |
| 100° C. | 1.3 |
| 200° C. | 1.5 |
| 250° C. | 1.5 |
| 300° C. | 2.1 |

*Example V*

The hard aluminum strips adhesively bonded as described in Example IV were stored for 200 hours at 200° C. After 45, 100 and 200 hours, samples of these strips were torn apart at various temperatures. The results of these measurements are summarized in the following Tables V and VI:

TABLE V.—TESTS WITH THE LOW MELTING POINT FORM OF TRIGLYCIDYLISOCYANURATE

| Duration of Storage Hours | Tearing Temperature, ° C. | Shear Strength, kg./mm.² |
|---|---|---|
| 45 | Room temperature | 1.25 |
| 45 | 100 | 1.45 |
| 45 | 200 | 1.5 |
| 45 | 250 | 1.5 |
| 45 | 300 | 2.1 |
| 100 | Room temperature | 1.4 |
| 100 | 100 | 1.4 |
| 100 | 200 | 1.45 |
| 100 | 250 | 1.5 |
| 100 | 300 | 2.1 |
| 200 | Room temperature | 1.35 |
| 200 | 100 | 1.35 |
| 200 | 200 | 1.4 |
| 200 | 250 | 1.5 |
| 200 | 300 | 2.2 |

TABLE VI.—TESTS WITH THE HIGH MELTING POINT FORM OF TRIGLYCIDYLISOCYANURATE

| Duration of Storage Hours | Tearing Temperature, ° C. | Shear Strength, kg./mm.² |
|---|---|---|
| 45 | Room temperature | 1.25 |
| 45 | 100 | 1.3 |
| 45 | 200 | 1.4 |
| 45 | 250 | 1.45 |
| 45 | 300 | 2.1 |
| 100 | Room temperature | 1.45 |
| 100 | 100 | 1.35 |
| 100 | 200 | 1.45 |
| 100 | 250 | 1.5 |
| 100 | 300 | 2.2 |
| 200 | Room temperature | 1.45 |
| 200 | 100 | 1.44 |
| 200 | 200 | 1.5 |
| 200 | 250 | 1.45 |
| 200 | 300 | 2.3 |

*Example VI*

Samples of the two forms of triglycidylisocyanurate prepared according to Example III were admixed with tetrahydrophthalic acid anhydride in a weight ratio of 10:15. Test samples were prepared of these mixtures which were hardened for 14 hours at 150° C. The mechanical properties of these test samples were measured during a continuous heat application of altogether 210 hours at 200° C. The values shown in the following Tables VII and VIII were obtained:

TABLE VII.—TESTS WITH THE LOW MELTING POINT FORM OF TRIGLYCIDYLISOCYANURATE

| Duration of Heating Hours | Martens Temperature, ° C. | Hardness, kg./mm.² | Impact Strength, cm. kg./cm.² |
|---|---|---|---|
| 6 | 218 | 1,450 | 8 |
| 24 | 229 | 1,330 | 8 |
| 75 | 234 | 1,280 | 11 |
| 170 | 244 | 1,280 | 12 |
| 210 | 258 | 1,000 | 15–16 |

TABLE VIII.—TESTS WITH THE HIGH MELTING POINT FORM OF TRIGLYCICYLISOCYANURATE

| Duration of Heating Hours | Martens Temperature, ° C. | Hardness, kg./mm.² | Impact Strength, cm. kg./cm.² |
|---|---|---|---|
| 6 | 221 | 1,370 | 6 |
| 24 | 245 | 1,330 | 6 |
| 75 | 256 | 1,270 | 8 |
| 170 | above 260 | 1,270 | 10 |
| 210 | above 260 | 1,270 | 8 |

*Example VII*

To confirm identification of the isocyanuric acid glycidyl esters, these were submitted to Infrared Analysis together with cyanuric acid glycidyl esters.

Following are the results of the Infrared Analysis. The following compositions were tested:

(1) Cyanuric acid trimethyl ester.
(2) Isocyanuric acid trimethyl ester.
(3) Cyanuric acid triglycidyl ester.
(4) Low melting form of isocyanuric acid triglycidyl ester (M.P. 104°).
(5) High melting form of isocyanuric acid triglycidyl ester (M.P. 155°).

The compositions 1 to 3 were produced by known methods, the compositions 4 and 5 by procedures of patent application Serial No. 288,593, filed June 18, 1963. To more readily determine whether cyanuric acid or isocyanuric acid derivatives are being dealt with, essential frequencies are pointed out. The following table contains the infrared-spectra of the mentioned 5 compositions, with the absorption frequencies given in cm.$^{-1}$.

TABLE IX

| Cyanuric acid trimethyl ester | Isocyanuric acid trimethyl ester | Cyanuric acid triglycidyl ester | Isocyanuric acid triglycidyl ester | | Remarks |
|---|---|---|---|---|---|
| | | | M.P. 104° | M.P. 155° | |
| ---------- | 1710 m Sh | ---------- | 1710 s Sh | 1710 s Sh | C=O-valence-vibration: |
| ---------- | 1682 s | ---------- | 1685 ss | 1685 ss | |
| 1588 s Sh | ---------- | ---------- | ---------- | ---------- | s-Triazine circle vibration. |
| 1560 ss | ---------- | 1565 ss | ---------- | ---------- | |
| 814 m-s | ---------- | 820 m-s | ---------- | ---------- | Do. |

Explanation of signs: m=middle intensity; ss=very strong; s=strong; Sh=Shoulder.

I claim:
1. Crystalline glycidyl esters of isocyanuric acid having an epoxide oxygen content of at least 14.1%.
2. A crystalline triglycidyl ester of isocyanuric acid having a melting point of 107° C.
3. A crystalline triglycidyl ester of isocyanuric acid having a melting point of 158° C.
4. A hardenable epoxide resin composition which comprises crystalline triglycidyl esters of isocyanuric acid having an epoxide oxygen content of at least 14.1% in combination with an epoxide resin curing agent selected from the group consisting of acidic and basic curing agents.
5. The resin of claim 4 wherein the amount of curing agent employed is from about 5 to 75% based on the weight of the mixture.
6. A hardened epoxide resin produced by hardening a crystalline triglycidyl ester of isocyanuric acid having an epoxide oxygen content of at least 14.1% with an epoxide resin with curing agent selected from the group consisting of acidic and basic curing agents.

References Cited
UNITED STATES PATENTS

| | | | |
|---|---|---|---|
| 2,741,607 | 4/1956 | Bradley et al. | 260—2 |
| 2,809,942 | 10/1957 | Cooke | 260—2 |
| 3,095,429 | 6/1963 | Smith et al. | 260—348 |

WILLIAM H. SHORT, *Primary Examiner.*

T. E. PERTILLA, *Assistant Examiner.*